United States Patent
Smith et al.

(10) Patent No.: US 10,699,276 B1
(45) Date of Patent: Jun. 30, 2020

(54) INTRADAY ALERT VOLUME ADJUSTMENTS BASED ON RISK PARAMETERS

(71) Applicant: Wells Fargo Bank, N.A., Charlotte, NC (US)

(72) Inventors: Christopher P. Smith, Marvin, NC (US); David J. Dietrich, Charlotte, NC (US)

(73) Assignee: WELLS FARGO BANK, N.A., San Francisco, CA (US)

(*) Notice: Subject to any disclaimer, the term of this patent is extended or adjusted under 35 U.S.C. 154(b) by 1110 days.

(21) Appl. No.: 14/958,275

(22) Filed: Dec. 3, 2015

(51) Int. Cl.
G06Q 40/00 (2012.01)
G06Q 20/40 (2012.01)
G06Q 20/10 (2012.01)

(52) U.S. Cl.
CPC ......... *G06Q 20/4016* (2013.01); *G06Q 20/10* (2013.01); *G06Q 20/4014* (2013.01)

(58) Field of Classification Search
CPC . G06Q 20/4016; G06Q 20/10; G06Q 20/4014
See application file for complete search history.

(56) References Cited

U.S. PATENT DOCUMENTS

| | | | | |
|---|---|---|---|---|
| 8,407,081 B1* | 3/2013 | Rajasenan | ......... | G06Q 10/0637 705/7.42 |
| 2002/0120559 A1* | 8/2002 | O'Mara | ......... | G06Q 40/00 705/38 |
| 2004/0006533 A1* | 1/2004 | Lawrence | ......... | G06Q 20/10 705/38 |
| 2004/0177053 A1* | 9/2004 | Donoho | ......... | G06Q 10/04 706/47 |
| 2005/0021384 A1* | 1/2005 | Pantaleo | ......... | G06Q 10/06 705/7.13 |
| 2005/0027651 A1* | 2/2005 | DeVault | ......... | G06Q 10/10 705/38 |
| 2007/0174214 A1* | 7/2007 | Welsh | ......... | G06O 20/4016 705/405 |

(Continued)

FOREIGN PATENT DOCUMENTS

| | | | | |
|---|---|---|---|---|
| CN | 104813355 | * | 7/2015 | ............. G06Q 40/02 |
| WO | WO-03038547 A2 | * | 5/2003 | ............. G06Q 40/08 |

OTHER PUBLICATIONS

Carolyn Colvin, Social Security Administration's Anti-Fraud Activities for Fiscal Year 2014 (Year: 2014).*

*Primary Examiner* — Alexander G Kalinowski
*Assistant Examiner* — William B. Bunker
(74) *Attorney, Agent, or Firm* — Walter Haverfield LLP; James J. Pingor

(57) ABSTRACT

Intraday alert volume adjustments based on risk parameters is provided. Users may be assigned risk levels, which may be determined based on historical information. An event associated with the user may be prioritized in relation to other events received by the user or by other users. The prioritization may be events received during a predetermined time range, or until an event has been pending for longer than a predetermined interval. The various events are output according to their relative rankings, which may indicate a descending order of risk level. As newly received events are received, they may be dynamically ranked in relationship to the previously received events that have not expired.

17 Claims, 10 Drawing Sheets

(56) References Cited

U.S. PATENT DOCUMENTS

| | | | |
|---|---|---|---|
| 2007/0203826 A1* | 8/2007 | Russell | G06Q 20/40 |
| | | | 705/38 |
| 2008/0275754 A1* | 11/2008 | Mugisa | G06Q 10/06 |
| | | | 705/7.14 |
| 2010/0191634 A1* | 7/2010 | Macy | G06Q 30/0202 |
| | | | 705/35 |
| 2011/0208663 A1* | 8/2011 | Kennis | G06F 21/55 |
| | | | 705/317 |
| 2014/0058914 A1* | 2/2014 | Song | G06Q 40/06 |
| | | | 705/35 |
| 2014/0081652 A1* | 3/2014 | Klindworth | G06Q 10/10 |
| | | | 705/2 |
| 2014/0330605 A1* | 11/2014 | Connolly | G06Q 10/063116 |
| | | | 705/7.16 |
| 2015/0100479 A1* | 4/2015 | Jorisch | G06Q 20/027 |
| | | | 705/39 |
| 2017/0147654 A1* | 5/2017 | Saperstein | G06F 16/24575 |
| 2017/0148025 A1* | 5/2017 | Le | G06Q 20/4016 |

* cited by examiner

INTRADAY ALERT VOLUME ADJUSTMENTS BASED ON RISK PARAMETERS

BACKGROUND

In a financial crimes investigation unit, the investigators are tasked with determining whether a transaction that was flagged as suspicious is fraudulent. Due to the volume of the transactions and based on regulatory requirements, there is not much time for the investigators to make the determination. Therefore, some transactions might not be reviewed and are allowed to proceed. In cases where the transaction is legitimate, this is not a problem. However, if the transaction is fraudulent, it may result in financial loss to a customer and/or financial institution as well as reputational loss to the financial institution. Further, any delay incurred for a legitimate financial transaction to proceed may be frustrating and inconvenient for the customer.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The various aspects provided herein are related to dynamically prioritizing received alerts in an order that indicates a risk level associated with each event. The prioritization may be configured to reduce and/or mitigate peaks that may occur due to an increase in the volume of intraday alerts.

An aspect relates to a processor that executes computer executable components stored in a memory. The computer executable components may include an analysis manager that classifies an identity of a user into a tier of a set of tiers based on attributes associated with the identity of the user. The computer executable components may also include a status manager that assigns a priority level to an interaction associated with the identity of the user, the priority level may be based at least in part on the tier. Further, the computer executable components may include an interface component that outputs an indication of the interaction and the priority level based on temporal data defined with respect the interaction. The indication of the interaction is output such that a relative ranking of the interaction is perceivable in comparison to respective priority levels assigned to other interactions associated with the identity of the user or with other identities of other users. Further, respective temporal data associated with the other interactions may overlap in part with the temporal data defined with respect to the interaction.

Another aspect relates to a method that includes assigning, by a system comprising a processor, an identity of a user to a risk level. The risk level may be determined based on historical information associated with the identity of the user. The method may also include prioritizing, by the system, an event associated with the identity of the user in comparison to other events received by other identities of other users during a predetermined time range. Further, the method may include outputting, by the system, the event and the other events in a ranking that indicates a descending order of risk level. Outputting the event and the other events may include dynamically ranking newly received events with the event and the other events.

A further aspect relates to a computer-readable storage device that stores executable instructions that, in response to execution, cause a system comprising a processor to perform operations. The operations may include classifying an identity of a user into a risk level of a set of risk levels based on attributes associated with the identity of the user. The operations may also include assigning a priority level to a transaction associated with the identity of the user. The priority level may be based at least in part on the risk level. Further, the operations may include outputting an indication of the transaction and the priority level based on temporal data defined with respect the transaction.

To the accomplishment of the foregoing and related ends, certain illustrative aspects of the innovation are described herein in connection with the following description and the annexed drawings. These aspects are indicative, however, of but a few of the various ways in which the principles of the innovation may be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

Various non-limiting embodiments are further described with reference to the accompanying drawings in which.

DETAILED DESCRIPTION

Figure 1:
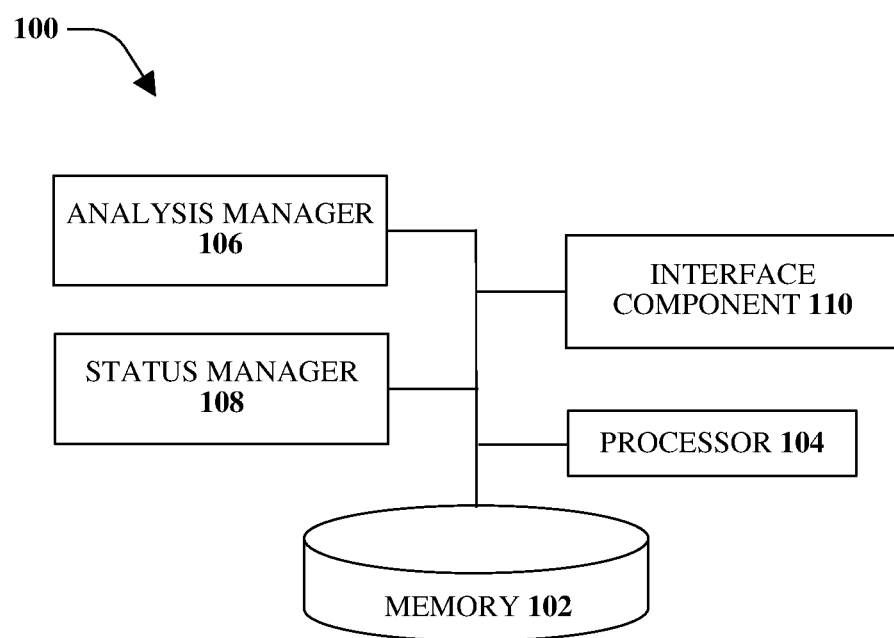
FIG. 1 illustrates an example non-limiting system configured to provide intraday alert volume adjustments based on risk parameters, according to an aspect.

The innovation is now described with reference to the drawings. In the following description, for purposes of explanation, numerous specific details are set forth in order to provide a thorough understanding of the subject innovation. It may be evident, however, that the innovation may be practiced without these specific details. In other instances, well-known structures and devices are shown in block diagram form in order to facilitate describing the innovation.

In various industries, there are individuals that need to make determinations, staff incoming interactions, or perform other time sensitive functions that may be prioritized quantitatively. For example, in a financial industry, various interactions (e.g., financial wire transfers) occur and need to be monitored for indications of fraudulent activities. Although various aspects will be discussed herein with respect to the financial industry, other industries may also utilized these aspects. Examples of other industries include insurance, securities, medical, pharmaceutical, real estate, electronic commerce, electronic interactions, and other industries.

Some available detection systems may provide alerts and the staffing implications for the monitored products and/or services may be determined. For example, it may be concluded that a business needs to staff for an alert volume at the intraday peak. Since people tend to work in units of eight-hours, it may be problematic to split a shift in order to staff appropriately. Shift differentials may be utilized, but extremities in the hours worked are not possible (e.g., middle of the night, extending well into the morning or late at night). Further, bicoastal operation is possible for coverage over a large geography in terms of shift differential, but does not cover peaks that may randomly occur.

In a financial services industry, wire transfers may be monitored. These wire transfers may produce intraday volume peaks, which may be bimodal. For example, there may be a peak in the middle of the day and then a larger peak (minutes) before a transfer window closes as customers attempt to process their financial wires for the day. After the transfer window closes, the customer has to wait for the next business day for the wire to process. Even though there may be coverage beyond a typical "9 to 5" setting, there still may be peaks within that setting that need to be handled. Those peaks should be staffed without a lot of variation in the amount of staffing coverage over large periods of time when the volume is low. Thus, there may be several consecutive hours during the day when there is little, if any, activity, but there is staff available to look at any wires or alerts that come through.

Transaction volume may vary throughout the day. Therefore, real-time alerts for time sensitive transactions (e.g., electronic funds transfer or "wires") may need staffing levels to accommodate the peak volume expected during the day. Given standard workdays and the limitations of staffing shifts using whole full-time equivalent (FTE) increments, there may be periods throughout the day that are relatively slow, and other periods that are rather busy. The disclosed aspects may enable real-time volume detection of the alert volume. Further, profile based exclusions may be applied to reduce the peak volume during certain periods of the day. The peak volume reduction may include excluding from the monitoring transactions from customer segments determined to have the lowest risk profiles. This determination may be based on attributes associated with fraud vulnerability. Accordingly, the peak volume reduction may enable lower staffing levels to accommodate lower peak volumes while maintaining the overall risk mitigation profile and risk tolerance targets.

FIG. 1 illustrates an example non-limiting system 100 configured to provide intraday alert volume adjustments based on risk parameters, according to an aspect. To address staffing issues as well as handle any peaks as they occur, the disclosed aspects are configured such that not every interaction or event (e.g., wire transfer or alert in the example provided) is presented with the same level of urgency.

The system 100 may include at least one memory 102 that may store computer executable components and/or computer executable instructions. The system 100 may also include at least one processor 104, communicatively coupled to the at least one memory 102. The at least one processor 104 may facilitate execution of the computer executable components and/or the computer executable instructions stored in the at least one memory 102. The term "coupled" or variants thereof may include various communications including, but not limited to, direct communications, indirect communications, wired communications, and/or wireless communications.

It is noted that although the one or more computer executable components and/or computer executable instructions may be illustrated and described herein as components and/or instructions separate from the at least one memory 102 (e.g., operatively connected to the at least one memory 102), the various aspects are not limited to this implementation. Instead, in accordance with various implementations, the one or more computer executable components and/or the one or more computer executable instructions may be stored in (or integrated within) the at least one memory 102. Further, while various components and/or instructions have been illustrated as separate components and/or as separate instructions, in some implementations, multiple components and/or multiple instructions may be implemented as a single component or as a single instruction. Further, a single component and/or a single instruction may be implemented as multiple components and/or as multiple instructions without departing from the example embodiments.

Also included in the system 100 may be an analysis manager 106 that may be configured to classify an identity of a user into a tier of a set of tiers. As used herein a "user" refers to a customer of the financial institution and/or one or more devices managed by the customer. In some aspects, the "user" may be a rogue user attempting to fraudulently gain financial access by impersonating actual customers of the financial institution. The set of tiers may be tiers associated with a vulnerability level and/or a risk level of the identity of the user. The identity of the user may relate to the actual user (e.g., person operating a communication device) and/or information related to the communication device (e.g., machine access code, telephone number, internet protocol address, temporary mobile subscriber identity (TMSI), international mobile subscriber identity (IMSI), and so on).

The tier selected by the analysis manager 106 for the identity of the user (simply referred to as "user" herein) may be based on one or more attributes associated with the user. The one or more attributes may be utilized by the analysis manager 106 to classify each customer into a category associated with a vulnerability or risk level. Thus, each attribute of the one or more attributes may independently carry some measure of the customer's vulnerability or risk.

By gathering all the information (e.g., attributes), the analysis manager 106 may classify each customer into a category (or tier), where there may be more than one category, provided the categories are a meaningful number of groupings used to describe the customer. The groupings may be mutually exclusive and exhaustive. Therefore, each customer belongs to only one group or category. Switching a customer from one grouping to another may be kept to a minimum. Therefore, it may be likely that once a customer is placed into a category, the customer remains in that category (e.g., for attributes that are robust and stable). However, the disclosed aspects are not limited to this implementation. Instead, customer information may be reviewed periodically to determine if there have been any changes that would allow the customer to be moved to a different tier. If there is a disturbing trend noticed with respect to fraudulent transfers, a customer may be automatically reclassified into a higher risk tier.

In an example of a tier hierarchy that has three levels, there may be levels for high-risk, medium-risk, and low-risk. Customers that have a lot of vulnerability, that have a lot of interaction in high-risk countries, that send large wires, or that have other high-risk attributes may be placed in the high-risk tier. These high-risk customers are those whose wires should always be reviewed, even if there is high volume. The middle group (e.g., medium-risk customers) may be those customers for which there is not sufficient data, or that are middle of the road in terms of risk (e.g., a few risk elements, a low amount of control or safety, and so on). The low-risk group may include those customers whose wires and behaviors indicate they have adequate controls in place. For example, their wires may be mostly domestic and are fairly invulnerable to online attacks or account takeovers. This does not mean that their wires will not be reviewed, but if peak level volume is experienced, the disclosed aspects may provide an indicator, and the wires from these low-risk customers may be placed at a bottom of a prioritization list.

Thus, with an available capacity at any given time, there might not be enough volume because the number of alerts is too high for all investigators to look at every alert. Accordingly, the interactions for the low-risk customer may be placed at the bottom of the list. Thus, if the investigators do not get to review these alerts, it might not be an issue with respect to financial loss (since no fraud is anticipated for these customers). This is because it has been determined that these customers are the safest customers given the attributes and data collected and examined. Thus, this may provide some relief in terms of risk exposure during those intraday peaks.

The possibility that not all interactions will be reviewed due to peaks exists (e.g., not enough people to look at all the risks). This possibility may be more pronounced at month end or quarter end, for example. The disclosed aspects apply logic to the priority of the order that the investigators look at the alerts, through utilization of a status manager 108. Without the disclosed aspects, the priority is random and the investigator randomly chooses which alert to review next. Accordingly, alerts for high-risk customers may not be examined while alerts for low-risk customers are examined. With the disclosed aspects, the order of review is no longer random. Instead, the alerts for the highest risk customer wires are prioritized to be reviewed first during intraday peaks or at other times. Further, the safest customers are placed at the bottom on the list so that the investigators know these customers are safe and if time does not permit, these wires do not need to be reviewed.

The status manager 108 may be configured to assign a priority level to an interaction associated with the user. The priority level assigned by the status manager 108 may be based at least in part on the tier assigned to the user by the analysis manager 106, for example.

As used herein an "interaction" may be any touch point or transaction between the financial institution and the user. According to an implementation, the interaction may be an interaction that the user is having with an electronic website associated with a financial entity. As used herein an "inter-action" may be any touch point or transaction between the financial institution and the user.

As used herein an "entity" or "financial entity" refers to a financial institution, such as a bank, persons operating on behalf of the financial institution, and/or communication devices managed by the financial institution and/or the persons operating on behalf of the financial institution. Additionally or alternatively, the entity may be a third party monitoring source or another type of entity that has a trusted relationship with the financial institution.

An interface component 110 may be configured to output an indication of the interaction and the priority level. The output may be in the form of a workflow tool. Further, the indications may populate and/or be removed based on various temporal limitations. For example, the indications may populate and reshuffle indications already being output (e.g., a high priority item populates ahead of medium priority items and so on).

For example, the output may be based on temporal data defined with respect to the interaction. According to an implementation, the indication of the interaction may be output such that a relative ranking of the transaction is perceivable in comparison to respective priority levels assigned to other interactions associated with other users. The respective temporal data associated with the other interactions may overlap, at least in part, with the temporal data defined with respect to the interaction.

Figure 2:
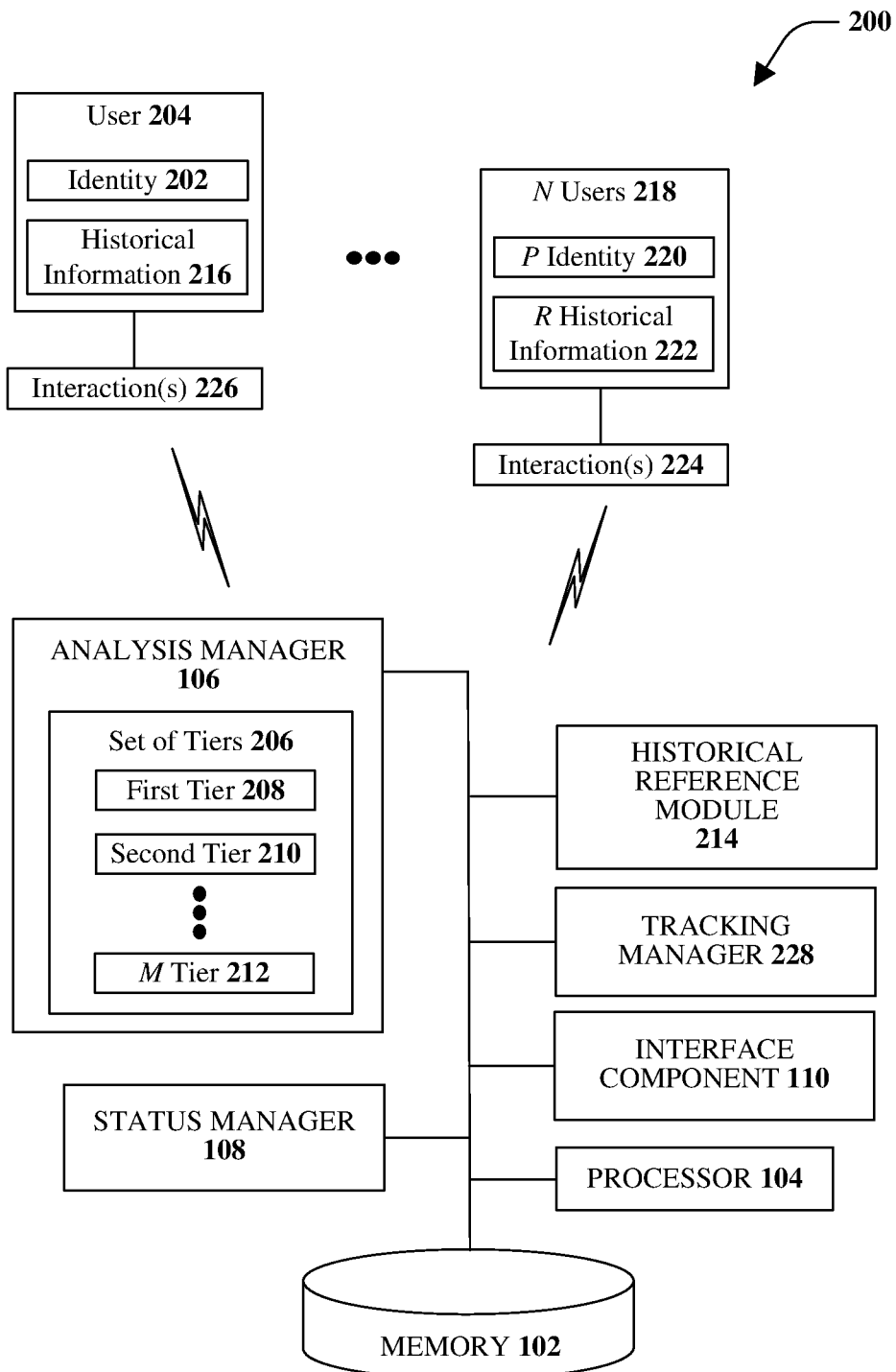
FIG. 2 illustrates an example, non-limiting system for evaluating information in order to adjust an intraday alert volume, according to an aspect.

FIG. 2 illustrates an example, non-limiting system 200 for evaluating information in order to adjust an intraday alert volume, according to an aspect. The analysis manager 106 may be configured to classify an identity 202 of a user 204 into a tier of a set of tiers 206. The set of tiers 206 may include, for example, a first tier 208 and a second tier 210. According to various implementations, the set of tiers 206 may include subsequent tiers, illustrates as an M tier 212, where M is an integer.

A historical reference module 214 may be configured to evaluate historical information 216 associated with the user 204. This historical information 216 may be utilized by the analysis manager 106 to determine the respective tier for the user 204. If a customer is new and historical information is not available, a high priority level may assigned to the user.

The historical information may be obtained over time by observing the interactions performed by the user 204. According to some implementations, attributes may be obtained based on direct input from the user 204. In some implementations, the attributes may be based on observed behavior, direct input from the user 204, inferred data, and other manners of collecting information.

According to an implementation, an attribute may be a behavioral attribute, which may include the number and types of wire transfers that a customer sends over time. An attribute may be based on security controls employed by the customer. For example, a determination may be made based on the whether or not the customer has a dedicated account for certain payment activities. In another example, a determination may be made whether the customer predominately or exclusively sends domestic wires, international wires, or a combination thereof. In a further example, it may be determined whether the customer transacts business in high-risk countries. Another determination may be whether the customer has a large amount of variance in the size of their typical transaction. Further, a determination may be whether the customer creates a large number of wires to new beneficiaries that have not been seen by the financial institution before. Other determinations may also be made and these examples are provided merely for purposes of explaining the disclosed aspects.

According to some implementations, one or more attributes may be based on how a customer constructs their wires. In other words, this may include details about what may be observed with respect to the customer's infrastructure. One example is the size of the customer (e.g., is the customer an individual or a business, and how large is the business). Another example is the version of browser the customer is using and/or when was the last time the customer updated the browser. A further example relates to the customer's internal technology and how current or "up to date" has the technology been maintained.

Attributes may also relate to literal controls. For example, customers may have dual custody (or custody levels that are greater than dual custody, such as triple custody). Thus, these customers have more than one person reviewing the wires. In another example, how the customer builds its wires may be utilized as an attribute. For example, does the customer always use a template, which may provide additional control layers? Further, some of the attributes may not be related to payments specifically, but may relate to how the customer interacts with the portal and what may be derived from the tools and/or devices the customer is using for the interaction.

According to an implementation, the tiers in the set of tiers 206 may be defined as risk levels. Thus, the analysis manager 106 may be configured to assign a high-risk level to a new user for which historical information is not available. In some cases, there is historical information available, but the information is not information obtained over at least a threshold length of time (e.g., not more than 6 months, not more than 1 year, less than two years, less than five years, and so on).

As illustrated, the disclosed aspects may be utilized with multiple users, illustrated as N users 218, where N is an integer. Each user of the N users 218 is associated with a P identity 220, where P is an integer. Further, each user of the N users 218 is associated with respective R historical information 222, where R is an integer. Further, each user of the N users 218 may be performing one or more interactions 224 with a financial entity, or a website (or other electronic interaction) with the financial entity.

The status manager 108 may be configured to assign a priority level to one or more interactions 226 received from the user 204. Further, the status manager 108 may be configured to assign a priority level to another interaction 226 from the user 204 and/or subsequent interactions 224 from one of the N users 218. The one or more priority levels established by the status manager 108 may be based, at least in part, on the tier assigned by the analysis manager 106.

According to some implementations, a tracking manager 228 may be configured determine a location of an initiation of the interaction(s) 224 and/or interactions 226. For example, the location may be based on information received from a device that submitted the request through a financial website. The location may be determined based on various location determinations including, but not limited to, a global positioning system, an internet protocol address, and others. The status manager 108 may be configured to compare the location to an expected location, which may be determined by the historical reference module 214 based on historical information (e.g., where has the originating device previously been located). If the location and the expected location do not match, the status manager 108 may increase the priority level (e.g., indicate that the transaction is higher risk). If the locations match, the priority level might not be changed.

According to some implementations, the tracking manager 228 may be configured to determine a machine access code of a device from which the interaction was originated. The status manager 108 may compare the machine access code to an expected machine access code, as determined by the historical reference module 214. If the codes do not match, the status manager 108 may increase the priority level (e.g., indicate that the transaction is higher risk). If the codes match, the priority level might not be changed.

Figure 3:
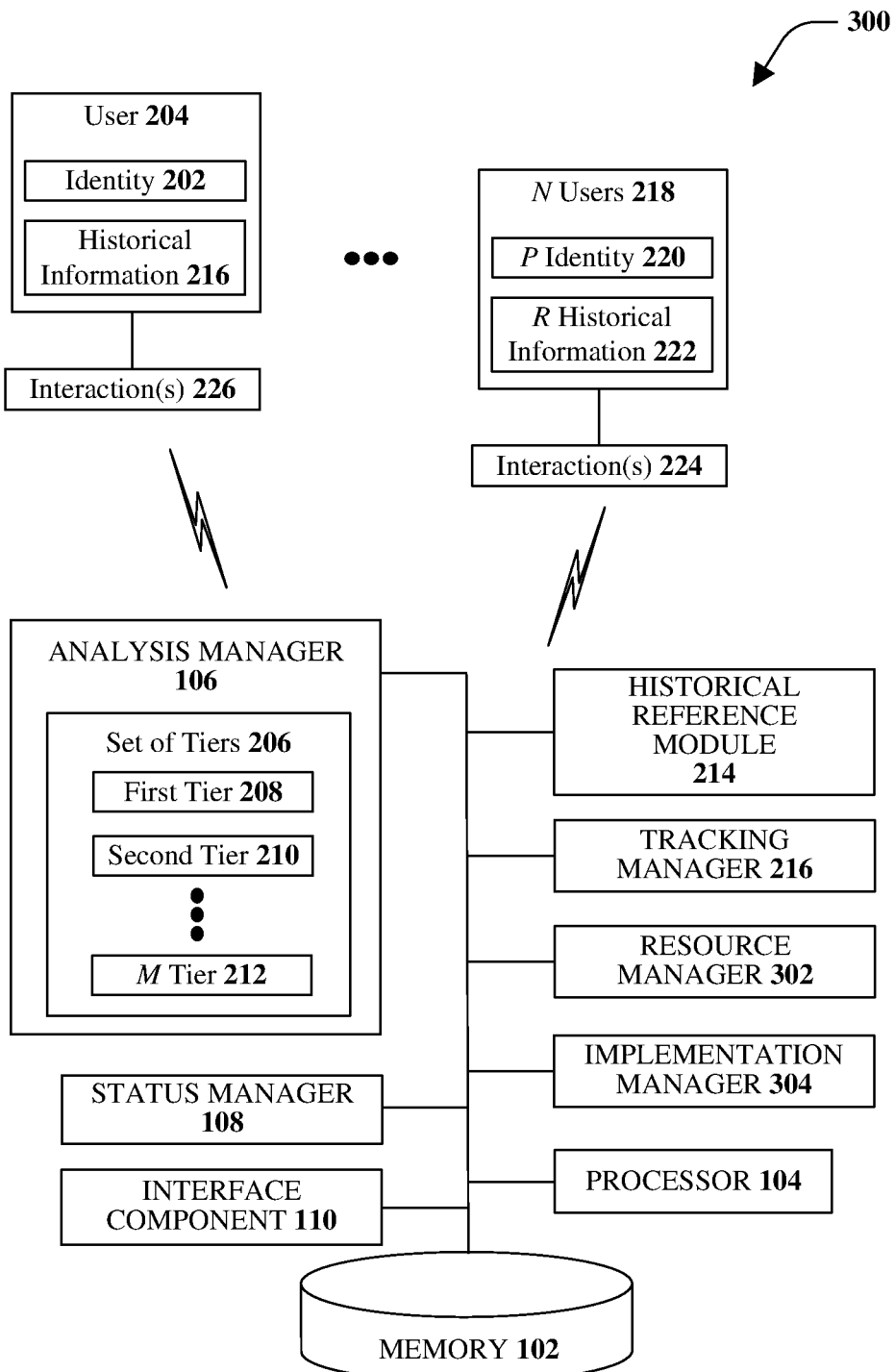
FIG. 3 illustrates an example non-limiting system for analyzing intraday volume of fraud alerts, according to an aspect.

FIG. 3 illustrates an example non-limiting system 300 for analyzing intraday volume of fraud alerts, according to an aspect. Various aspects disclosed herein provide for a segmentation solution to segment the customer population into classes of categories. For example, the customer population may be segmented into three classes, such as highest, moderate, and lowest risk categories. However, according to some implementations, fewer or more than three categories may be utilized. The segmentation solution may be statistically derived. Further, each customer may be included in one and only one category, which may enable a systematic assessment of the intraday volume of alerts. This may provide the ability to defer investigation of alerts generated on transactions created by the lowest risk customers until the transaction and alert volume has once again fallen below a threshold level that may be accommodated by current staffing levels. The system may "poll" an investigator case management system, for example, a configurable number of times per hour, and determine if volume may be addressed given the number of investigators currently working the queue. Once a threshold that indicates the existing staffing level may no longer accept new alerts, the system may automatically apply an exclusion criterion to ignore alerts from customers assigned to the lowest risk category, or assign those alerts the lowest possible priority within the case management queue. When volume has returned to a level that may be accommodated by the current staffing level, the exclusion criteria may be lifted. This may enable more consistent throughput based on staffing levels given intraday volume peaks, while maintaining coverage throughout the day on transactions with the highest risk for fraud.

The classification system may be applied universally, wherein the prioritization is performed twenty-four hours a day, seven days a week. However, according to some implementations, the classification may be applied based on a global rule that is created such that the classification system is only applied when there is a threshold that has been exceed for the capacity that is available at any point in time. The system 300 may include a resource manager 302 that may be configured to compare a number of transactions associated with a current time to an available staffing level. For example, one or more interactions 226 may be received from the user 204 and/or one or more interactions 224 may be received from one or more of the N users 218. These interactions may be received at any time, day or night. However, at certain times, the interactions may exceed the current staffing level available to handle all the interactions.

The comparison performed by the resource manager 302 may be based on averages associated with how many alerts are able to be handled per person during a given time period (e.g., 5 minutes). For example, during a certain time of day (e.g., between noon and 1 p.m.), there are ten investigators (based on observations of the number of investigators actively reviewing cases). It may also be known, given the amount of data available, how long it takes to work a case. Another lookup table may be provided to indicate that in any point in time when the volume exceeds capacity, apply the classification to the priority.

Thus, according to some implementations, during the lowest volume parts of the day there may be no classification and all of the alerts may be equally important. The classification indication, however, may be output for the investigator's benefit because it is triage activity performed by the investigator (e.g., a mental classification). However, with the use of the disclosed aspects, the investigator may skip the step (e.g., human based judgement is removed) and they may work more alerts at any point in time using the time saved. Further to this implementation, if it is a busy period of the day and there are more alerts than may be worked by the staff that is available at that point in time, the disclosed aspects may be applied in order to prioritize the alerts such that the investigators look at the highest risk ones first. Thus, once a threshold has been reached and it is determined that x>y, where x is number of alerts and y is numbers of investigators (e.g., the number of alerts is greater than the staffing level), the classification system may be deployed, priority is determined, and the alerts show up in the order they should be reviewed. Thus, logic may be applied that understands x and y right now, as well as every second of the day.

The investigators may not need to see the alerts for the lowest risk group. Therefore, according to some implementations, the disclosed aspects may be configured so that the alerts for these customers are automatically approved and not placed in the investigator's queue. Alternatively, the alerts for the lowest risk customers may be placed at the bottom of the queue.

An implementation manager 304 may be configured to cause interactions to be ranked according to a priority level. The priority level may be one of a low priority, a medium priority, and a high priority, for example. Based on a determination by the resource manager 302 that the interactions exceed the capacity of a current staffing level, the implementation manager 304 may be configured to cause a first set of interactions of the number of interactions ranked as the low priority to populate a ranking window at a bottom of an event notification. Further to this determination, the implementation manager 304 may be configured to cause a second set of interactions of the number of interactions ranked as the high priority to populate the ranking window at a top of the event notification. In addition, a third set of interactions of the number of interactions may be ranked as the medium priority by the implementation manager 304. The medium priority interaction may populate the ranking window above the first set of interactions and below the second set of interactions (e.g., between the high-priority and low-priority interactions).

In an alternative implementation, the implementation manager 304 may be configured to cause interactions ranked as the low priority (or lowest level of risk) to automatically be approved based on a determination that the number of interactions exceeds a capability of the available staffing level. In this case, the low priority does not show up on a ranking window of an event notification.

The interface component 110 may be configured to output an indication of the transaction and the priority level in a perceivable format. According to an implementation, the interface component 110 (as well as other interface components discussed herein) may provide a graphical user interface (GUI), a command line interface, a speech interface, Natural Language text interface, and the like. For example, a GUI may be rendered that provides a user with a region or means to load, import, select, read, and so forth, various requests and may include a region to present the results of the various requests. These regions may include known text and/or graphic regions that include dialogue boxes, static controls, drop-down-menus, list boxes, pop-up menus, as edit controls, combo boxes, radio buttons, check boxes, push buttons, graphic boxes, and so on. In addition, utilities to facilitate the information conveyance, such as vertical and/or horizontal scroll bars for navigation and toolbar buttons to determine whether a region will be viewable, may be employed. Thus, it might be inferred that the user did want the action performed.

The user may also interact with the regions to select and provide information through various devices such as a mouse, a roller ball, a keypad, a keyboard, a pen, gestures captured with a camera, a touch screen, and/or voice activation, for example. According to an aspect, a mechanism, such as a push button or the enter key on the keyboard, may be employed subsequent to entering the information in order to initiate information conveyance. However, it is to be appreciated that the disclosed aspects are not so limited. For example, merely highlighting a check box may initiate information conveyance. In another example, a command line interface may be employed. For example, the command line interface may prompt the user for information by providing a text message, producing an audio tone, or the like. The user may then provide suitable information, such as alphanumeric input corresponding to an option provided in the interface prompt or an answer to a question posed in the prompt. It is to be appreciated that the command line interface may be employed in connection with a GUI and/or API. In addition, the command line interface may be employed in connection with hardware (e.g., video cards) and/or displays (e.g., black and white, and EGA) with limited graphic support, and/or low bandwidth communication channels.

Figure 4:
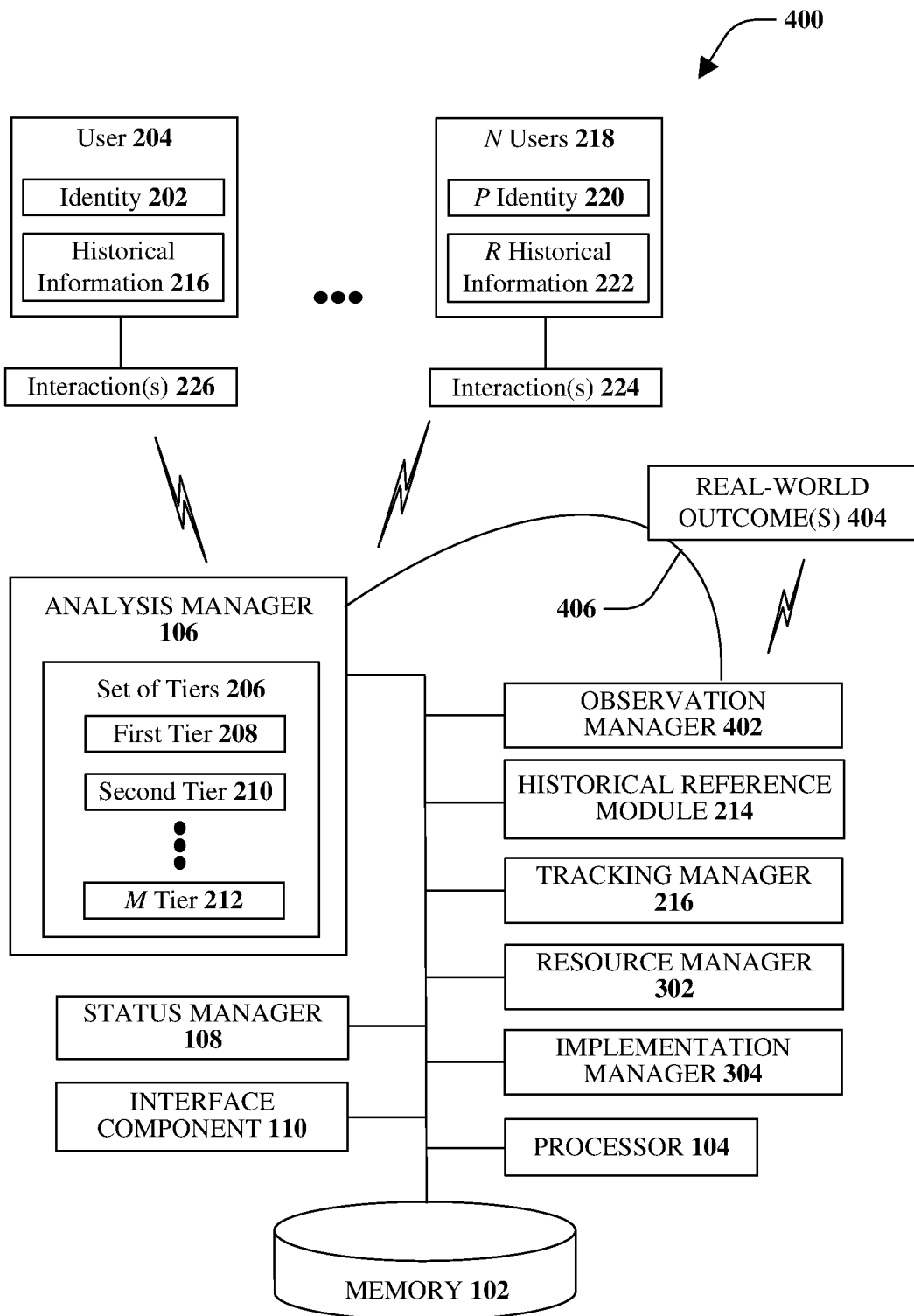
FIG. 4 illustrates an example non-limiting system for providing a feedback loop to determine the integrity of intraday alert volume adjustments based on risk parameters, according to an aspect.

FIG. 4 illustrates an example non-limiting system 400 for providing a feedback loop to determine the integrity of intraday alert volume adjustments based on risk parameters, according to an aspect. The system 400 may be configured as a detection and alerting system. For example, the analysis manager 106 may be configured to classify each user into a risk level. For example, there may be two or more risk levels associated with the trustworthiness of the user and the user's interactions based on known (e.g., historical) information that has been collected based on interactions the user has had with the system 400. The information related to the classification of the risk levels (or alternatively the tiers as discussed above) may be retained in a storage media, such as a database, the at least one memory 102, or another computer-readable storage device.

The classification for each customer might only be reviewed periodically (e.g., twice a year, once a year, every two years, and so forth). However, according to some implementations, the classification for one or more customers might be reviewed more (or less) often. For example, if a customer is new to the financial institution, the customer may automatically be placed at a highest risk level. As historical data is collected for the customer (e.g., over a period of three months, six months, and so on), the risk level may be reassessed and kept the same or moved to a different (e.g., lower) risk level.

At about the same time as the user initiates a transaction (e.g., wire transfer according to a financial industry implementation), which may occur one or more times per day (or some days may not occur at all), the analysis manager 106 may access the predetermined risk level for the user. Based on this information the status manager 108 may assign a priority to the transaction. The status manager 108 determines the priority level in real-time (e.g., at the same time as the transaction is received, at substantially the same time as the transaction is received, and so forth).

In some implementations, the status manager 108 may evaluate data associated with the transaction in order to determine the priority level. For example, if the data retrieved by the analysis manager 106 indicates the user is a low priority risk, but the status manager 108 determines the transaction does not match various historical data, the priority level may be increased to a higher risk level (e.g., from low to medium, from medium to high, from high to severe, and so on).

The interface component 110 may output the respective transactions in a workflow tool. In an example, the workflow tool may provide an indication of a visual representation of the transaction and its relative ranking as compared to other transactions. For example, if the customer is determined to be a super safe customer, the transaction(s) for that customer may be placed at a bottom of a list, or on a second page of the list. If it is determined that the customer is a high-risk customer, the transaction(s) for that customer may be placed at a top of the list. Customers that are determined to be ranked between high-risk and low-risk may be placed in the middle of the listing.

Although discussed with respect to positions on a ranking or listing, there may be other mechanisms utilized to provide the relative ranking in addition to or in place of the listing position. For example, the transactions may be assigned different colors (e.g., red for high-risk, yellow for medium-risk, green for low-risk). In another example, the transactions may be assigned numbers (e.g., "1" for high-risk, "2" for medium-high-risk, "3" for medium-low-risk, "4" for low-risk, and "5" for safest customer, and so on). In another example, an intensity of brightness of a transaction on a display screen may indicate higher risk. In another example, blinking (e.g., flashing on and off) of a transaction listed on the display screen may indicate higher risk, and so on.

The workflow tool may be presented in the investigator's queue of transactions that need to be reviewed. At any point in time, there may be a number of alerts (e.g., transactions) that may be listed in an order of priority. This listing may be dynamic such that as new transactions are received these transactions are placed in their relative order in the listing. Further, as the transactions age and have not been reviewed, the transactions may be removed from the listing. The removal of the transaction indications may be based on business or regulatory requirements.

As the investigators are able to review the transactions, the transactions are allowed, or placed on alert for further review (e.g., escalated). As mentioned, if the transactions expire (e.g., have been aging for over a set time period), the transactions may be automatically allowed and removed from the queue. Thus, if the low-risk transactions are reviewed last, and are not reviewed at all due to the time constraints, the risk for fraud occurring is low. Accordingly, since the high-risk transactions are flagged as high-risk and prioritized over the low-risk transactions, there is a greater chance that these high-risk transactions may receive the necessary review. This is in contrast to systems that do not use the disclosed aspects where an investigator randomly chooses which transactions to review first. The randomly chosen transaction may be a high-risk transaction or may be a low-risk transaction. Randomly reviewing the low-risk transactions may be a waste of time, especially when it is reviewed instead of a high-risk transaction, which is automatically allowed and turns out to be fraudulent.

According to some implementations, an observation manager 402 may be configured to evaluate one or more real-world outcomes 404. A determination of the evaluation may be fed back to the analysis manager 106 through a feedback loop 406, for example. Thus, the outcomes from the investigative activities may be utilized to validate a model that is producing the segmentation (e.g., placing the customers into respective tiers or risk levels) and classification (e.g., assigning a priority level). The validation or review may determine whether there is fraud occurring in one or more low-risk groups or if there is more fraud in one or more high-risk groups. This validation (e.g., feedback loop) may be ongoing such that adjustments are made over time to provide a robust and stable system and to minimize switching between groups. According to some implementations, this continuous feedback loop may be utilized to evaluate the total risk.

In an implementation, the amount of risk may be quantified with and without the use of the disclosed aspects. For example, if the disclosed aspects are not utilized, an investigator randomly chooses the alerts that s/he will review. Thus, the investigator may be reviewing a transaction for a very low-risk customer when that time would be better served reviewing a transaction for a high-risk customer. In some instances, transactions for low-risk customers do not need to be reviewed at all, saving additional resources. The number of transactions being reviewed by an investigator may be quantified when the disclosed aspects are not utilized. After the disclosed aspects are implemented, the amount of transactions reviewed may be quantified as well as the number of high-risk versus low-risk transactions. This number may be compared to the previous number (before the implementation) to assess the overall efficiency of the adjustments to the intraday alerts.

Figure 5:
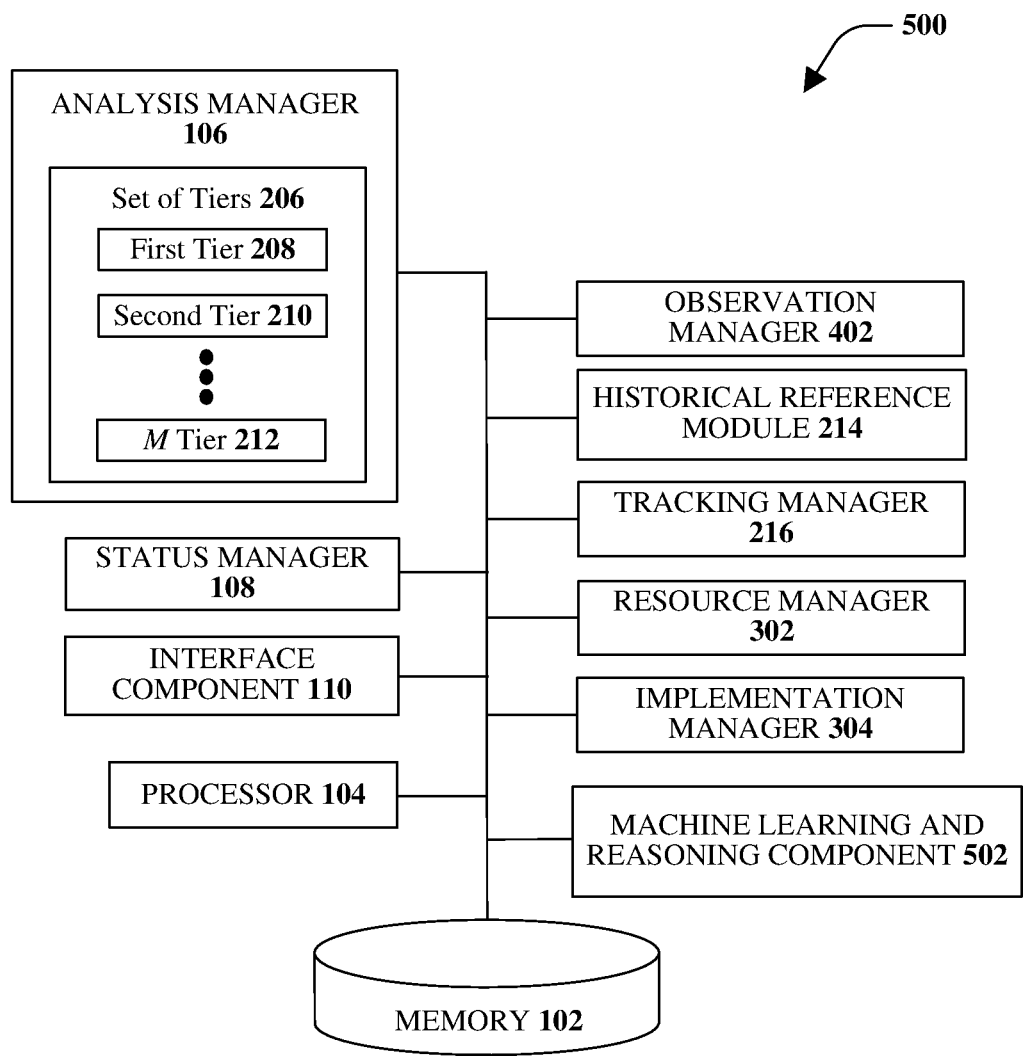
FIG. 5 illustrates an example, non-limiting system that employs automated learning to facilitate one or more of the disclosed aspects.

FIG. 5 illustrates an example, non-limiting system 500 that employs automated learning to facilitate one or more of the disclosed aspects. For example, a machine learning and reasoning component 502 may be utilized to automate one or more of the disclosed aspects. The machine learning and reasoning component 502 may employ automated learning and reasoning procedures (e.g., the use of explicitly and/or implicitly trained statistical classifiers) in connection with performing inference and/or probabilistic determinations and/or statistical-based determinations in accordance with one or more aspects described herein.

For example, the machine learning and reasoning component 502 may employ principles of probabilistic and decision theoretic inference. Additionally or alternatively, the machine learning and reasoning component 502 may rely on predictive models constructed using machine learning and/or automated learning procedures. Logic-centric inference may also be employed separately or in conjunction with probabilistic methods.

The machine learning and reasoning component may infer a risk-level of a customer and associated risk levels of transactions from that customer by obtaining knowledge about the customer, including historical information and current information. Based on this knowledge, the machine learning and reasoning component 502 may make an inference based on which customers are low-risk, which customers are high-risk, and status of customers that are categorized between low-risk and high-risk, or combinations thereof.

As used herein, the term "inference" refers generally to the process of reasoning about or inferring states of the system, a component, a module, the environment, and/or customers (or devices associated with the customers) from a set of observations as captured through events, reports, data, and/or through other forms of communication. Inference may be employed to identify a specific context or action, or may generate a probability distribution over states, for example. The inference may be probabilistic. For example, computation of a probability distribution over states of interest based on a consideration of data and/or events. The inference may also refer to techniques employed for composing higher-level events from a set of events and/or data. Such inference may result in the construction of new events and/or actions from a set of observed events and/or stored event data, whether or not the events are correlated in close temporal proximity, and whether the events and/or data come from one or several events and/or data sources. Various classification schemes and/or systems (e.g., support vector machines, neural networks, logic-centric production systems, Bayesian belief networks, fuzzy logic, data fusion engines, and so on) may be employed in connection with performing automatic and/or inferred action in connection with the disclosed aspects.

The various aspects (e.g., in connection with intraday alert volume adjustments based on risk parameters) may employ various artificial intelligence-based schemes for carrying out various aspects thereof. For example, a process for determining if a particular customer should be prioritized a certain way based on historical information, whether a customer's current attributes do not match historical attributes, and implementing one or more actions based on the matching may be enabled through an automatic classifier system and process.

A classifier is a function that maps an input attribute vector, x=(x1, x2, x3, x4, xn), to a confidence that the input belongs to a class. In other words, f(x)=confidence(class). Such classification may employ a probabilistic and/or statistical-based analysis (e.g., factoring into the analysis utilities and costs) to prognose or infer an action that should be employed to determine what alerts should be held for further scrutiny, which alerts should be automatically approved or placed at a bottom a list, which alerts should be escalated, and so on. In the case of intraday alert volume adjustments, for example, attributes may be identification of a transaction and the customer from which the transaction is received and the classes are a risk level associated with the customer.

A support vector machine (SVM) is an example of a classifier that may be employed. The SVM operates by finding a hypersurface in the space of possible inputs, which hypersurface attempts to split the triggering criteria from the non-triggering events. Intuitively, this makes the classification correct for testing data that may be similar, but not necessarily identical to training data. Other directed and undirected model classification approaches (e.g., naïve Bayes, Bayesian networks, decision trees, neural networks, fuzzy logic models, and probabilistic classification models) providing different patterns of independence may be employed. Classification as used herein, may be inclusive of statistical regression that is utilized to develop models of priority.

One or more aspects may employ classifiers that are explicitly trained (e.g., through a generic training data) as well as classifiers that are implicitly trained (e.g., by observing customer behavior, by receiving extrinsic information, and so on). For example, SVM's may be configured through a learning or training phase within a classifier constructor and feature selection module. Thus, a classifier(s) may be used to automatically learn and perform a number of functions, including but not limited to determining according to a predetermined criteria when to implement an action, which action to implement, what transactions should be reviewed, relationships between transactions and customers, and so forth. The criteria may include, but is not limited to, similar requests, historical information, and so forth.

Additionally or alternatively, an implementation scheme (e.g., a rule, a policy, and so on) may be applied to control and/or regulate alerts and resulting actions, and so forth. In some implementations, based upon a predefined criterion, the rules-based implementation may automatically and/or dynamically interpret interactions. In response thereto, the rule-based implementation may automatically interpret and carry out functions associated with the interactions by employing a predefined and/or programmed rule(s) based upon any desired criteria.

Methods that may be implemented in accordance with the disclosed subject matter will be better appreciated with reference to the flow charts. While, for purposes of simplicity of explanation, the methods are shown and described as a series of blocks, it is to be understood and appreciated that the disclosed aspects are not limited by the number or order of blocks, as some blocks may occur in different orders and/or at substantially the same time with other blocks from what is depicted and described herein. Moreover, not all illustrated blocks may be required to implement the disclosed methods. It is to be appreciated that the functionality associated with the blocks may be implemented by software, hardware, a combination thereof, or any other suitable means (e.g. device, system, process, component, and so forth). Additionally, it should be further appreciated that the disclosed methods are capable of being stored on an article of manufacture to facilitate transporting and transferring such methods to various devices. Those skilled in the art will understand and appreciate that the methods might alternatively be represented as a series of interrelated states or events, such as in a state diagram.

Figure 6:
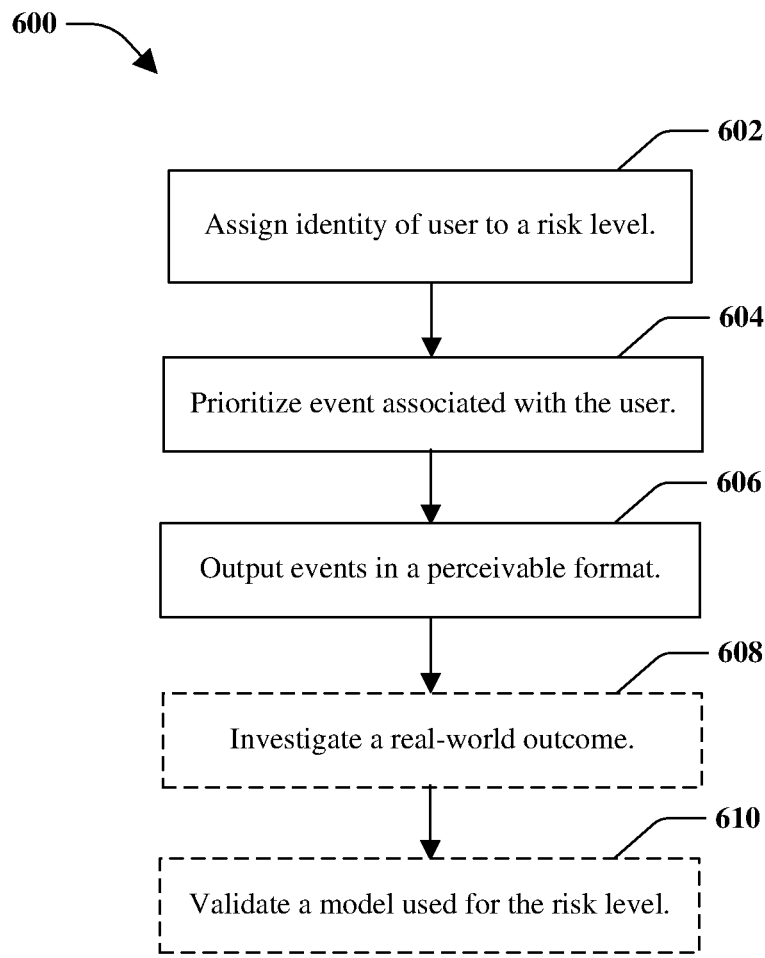
FIG. 6 illustrates an example, non-limiting method for quantification and assessment of reliability of subjective determinations, according to an aspect.

FIG. 6 illustrates an example, non-limiting method 600 for quantification and assessment of reliability of subjective determinations, according to an aspect. The method 600 in FIG. 6 may be implemented using, for example, any of the systems, such as the system 200 (of FIG. 2), described herein.

At 602, an identity of a user is assigned to a risk level. The risk level may be determined based on historical information associated with the user. For example, the historical information may include previous interactions performed by the user, a security protocol used by the user to perform the interactions, and/or other data. If the user is a new user without (or with little) historical information, the user may be assigned to a highest risk level.

An event associated with the user is prioritized, at 604. The prioritization may be in comparison with other events received the other users during a predetermined time range. For example, events may expire a certain time after the event is received. After the time has expired, the event is automatically allowed to proceed if no action was taken (e.g., denied, allowed, escalated as a higher risk, and so on).

The event and the other events are output, at 606. The output may be in any perceivable format (e.g., visual, audio, and so on). The output may include a ranking that indicates a descending order of risk level (e.g., a highest-risk level at a beginning of the ranking and the lowest-risk level at an end of the ranking). According to some implementations, the outputting may include dynamically ranking newly received events with the previously received events. The newly received events may be categorized among the previously received events based on a relative order of risk level.

In an optional implementation, the method 600 may include analyzing an outcome based on investigative activities, at 608. The investigative activities may include determine real-world outcomes associated with various events. Further, at 610, a model used for assigning the risk level may be validated. For example, if an alert is allowed to proceed and later turns out to be fraudulent, this information may be collected and used to adjust a risk level associated with the user and/or to access data received at about the same time as a subsequent event is received. In another example, the real-world data may indicate that an event was marked fraudulent, when it turned out to be a legitimate event. In a further example, events marked fraudulent may be fraudulent and/or events marked legitimate may turn out to be legitimate. Thus, the model may be determined to be working correctly.

Figure 7:
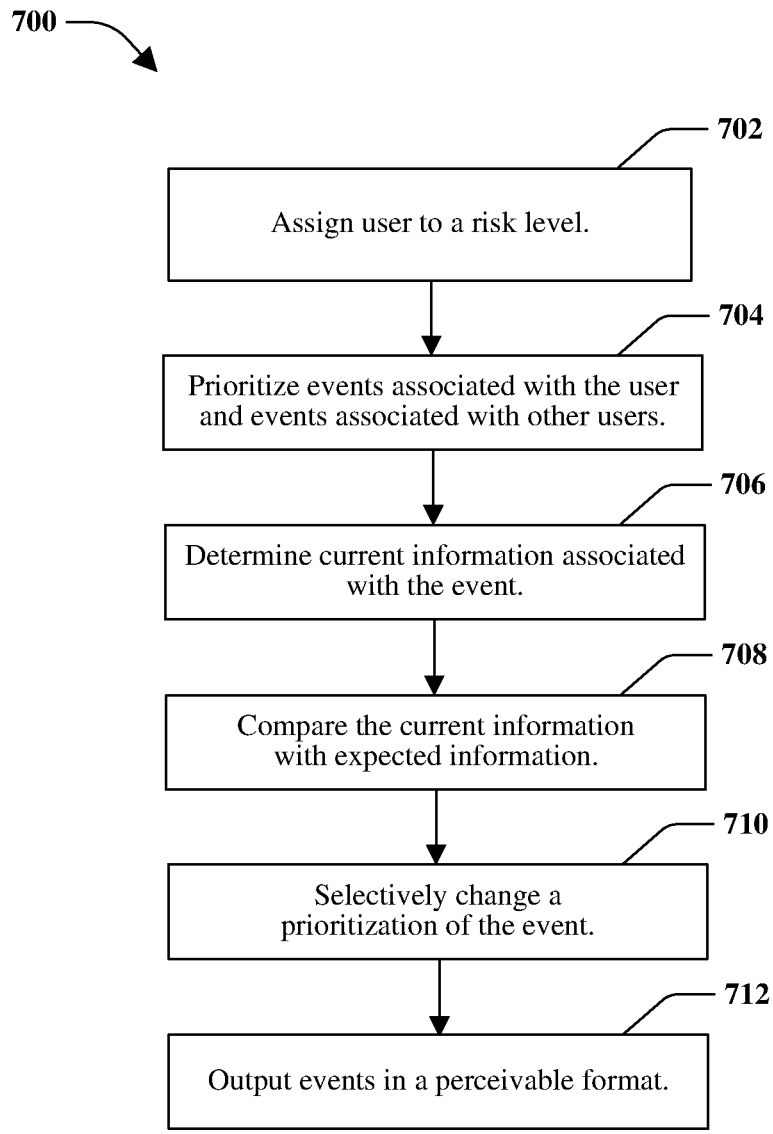
FIG. 7 illustrates an example, non-limiting method for changing a risk level of an event based on observed data, according to an aspect.

FIG. 7 illustrates an example, non-limiting method 700 for changing a risk level of an event based on observed data, according to an aspect. The method 700 in FIG. 7 may be implemented using, for example, any of the systems, such as the system 400 (of FIG. 4), described herein.

At 702, a user is assigned to a risk level based on historical information that is received, observed, and/or inferred based on known information about the user. In a similar manner, other users are assigned to the same risk level or to other risk levels. In an example, the risk levels may be included in a set of risk levels, such as a highest risk level, a high-risk level, a medium-high-risk level, a medium-risk level, a medium low-risk level, a low-risk level, and a lowest risk level. At about the same time as events are received, at 704, each event is associated with the respective user and prioritized with other events received from the user and/or the events received from other users.

At 706, current data associated with the event is determined. According to an implementation, the current data may be an origin location of the event (e.g., a geographic location of a device from which the event was received). In accordance with another implementation, the current data may be a machine access identity of the machine from which the event was received. According to some implementations, the current data is other information associated with the event.

The current data is compared to expected data, at 708. The expected data may be determined or inferred based on historical information related to the user. For example, if the current data is an origin location, the expected information may be an expected origin location. Thus, if a company is the user, the events received from that company may be received from a single, centralized location for the company, or may be received from one of the company locations. Thus, if the current data is based on a location where the company is not located, it may indicate a new location for the user, or it may indicate fraud.

In another example, if the current data relates to a machine access code, the expected data may be machine access codes from which events for the user have previously been received. Thus, if a new machine access code relates to a current event, it may relate to a new machine used by the user, or it may indicate fraud.

At 710, a prioritization of the event is selectively changed based on the comparison. For example, if the current data matches the expected data, the prioritization is not changed. In this case, the original prioritization for the user is output, at 712, in a perceivable format and indicates a ranking of the event in comparison with other events.

In this case, if the current data does not match the expected data, the risk level may be evaluated. For example, if the risk level was high-risk, the level may be changed to highest risk. In another example, if the risk level was medium, the risk level may be elevated to high-risk. In a further example, if the risk level was low-risk, the level may be elevated to medium-risk or high-risk depending on rules associated with the escalation of the risk level. Thus, at 712, the indication of the changed risk level may be output in a perceivable format.

Figure 8:
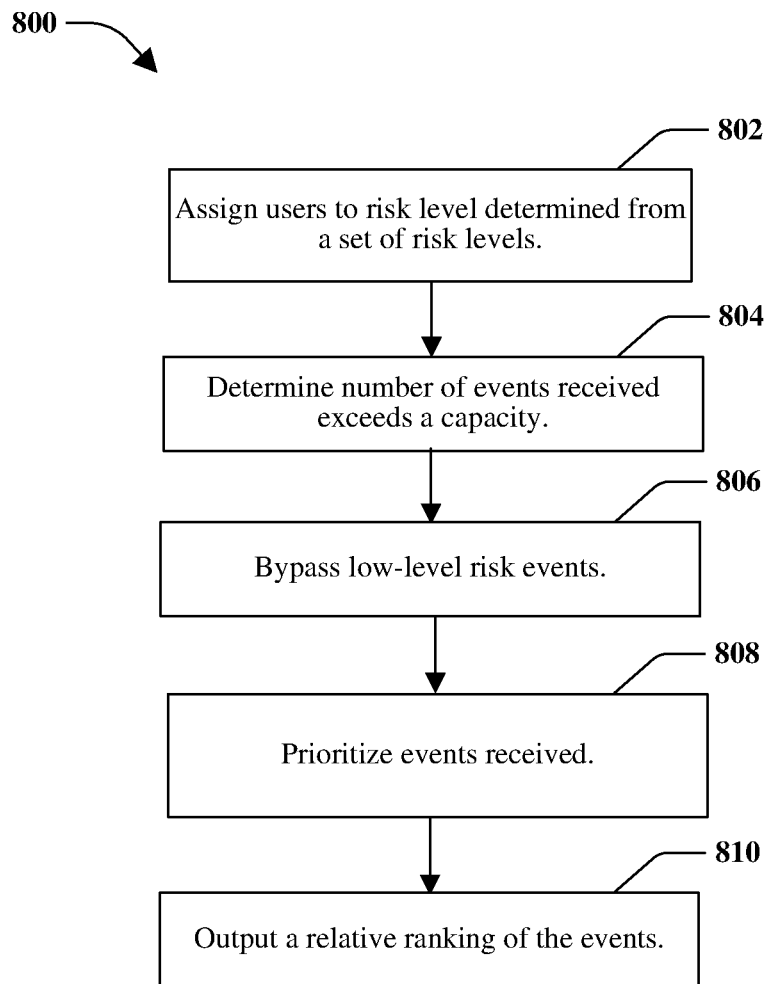
FIG. 8 illustrates an example, non-limiting method for evaluating a capability to review a level of interactions received, according to an aspect.

FIG. 8 illustrates an example, non-limiting method 800 for evaluating a capability to review a level of interactions received, according to an aspect. The method 800 in FIG. 8 may be implemented using, for example, any of the systems, such as the system 300 (of FIG. 3), described herein.

At 802, users are assigned to risk levels determined from a set of risk levels. For example, a first set of users may be determined to be low-risk users and a second set of users may be determined to be medium-risk users. Further, at least a third set of users may be determined to be high-risk users. The determinations may be made individually for each user and may be based on historical interactions with the respective user (e.g., historical information). According to some implementations, the determinations may be made based on historical information that comprises attributes that independently carry a measure of vulnerability of the user.

At 804, a determination is made that a number of events received exceeds a capacity level during a review period. The capacity level may be based on the number of individuals available to process the events. According to an implementation, the determination may be made in on ongoing or real-time manner.

Based on a determination that the number of events received exceeds the capacity level during the review period, at 806, a notification of events ranked as a low-risk level is bypassed. The bypassing may include placing the events ranked as a low-risk level at a bottom (or on a next page) of an event notification. According to some implementations, the bypassing may include ignoring the low-risk level events, or automatically approving completion of the low-risk level events.

At 808, an event associated with the user is prioritized in comparison to other events received by the same user and other users. For example, if the user is a medium-risk user and two or more events are received from that user, the two or more events may be ranked below the high level risk events and above the low level risk events, and in an order based on time received (e.g., time stamp).

A relative ranking of the events listed in an order of risk level is output, at 810. The output may be updated dynamically or in real-time such that the events are reshuffled and newly received events are placed according to their relative ranking with respect to the previously received events.

Figure 9:
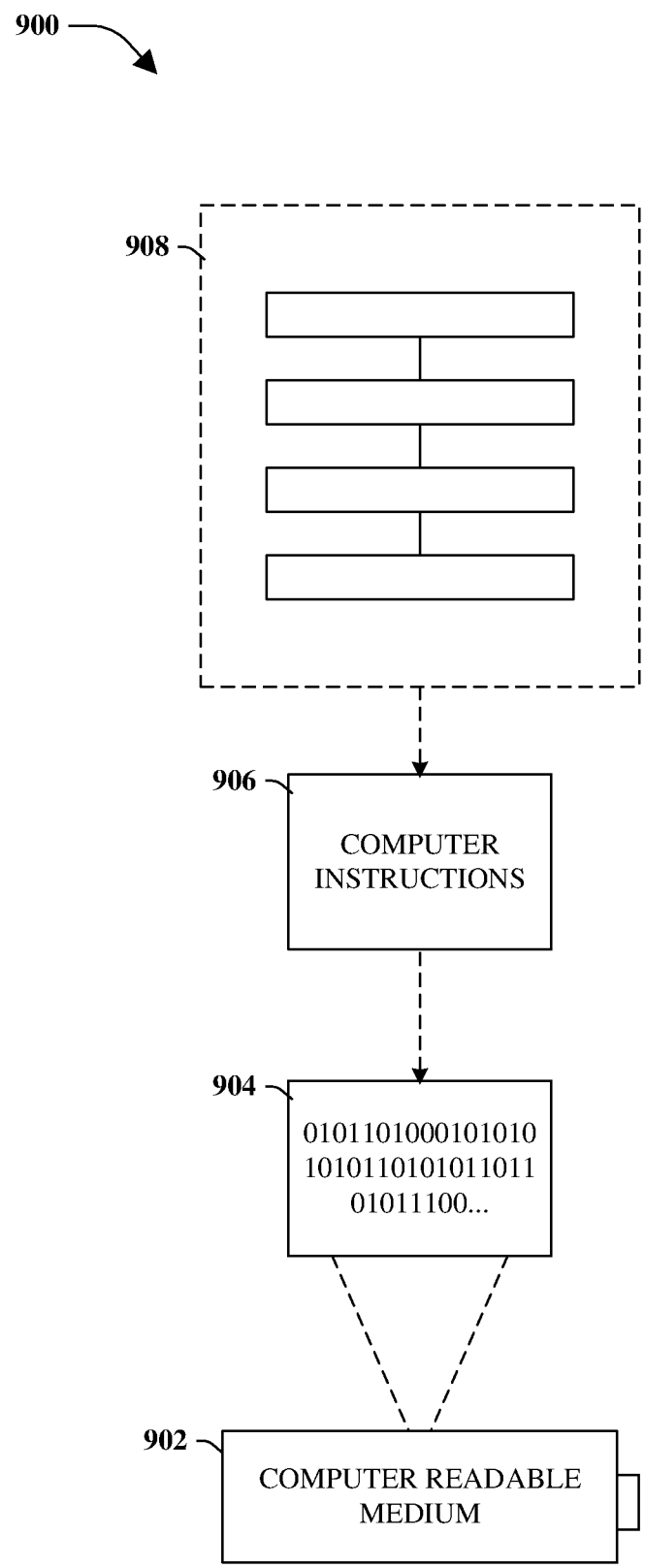
FIG. 9 illustrates an example, non-limiting computer-readable medium or computer-readable device including processor-executable instructions configured to embody one or more of the aspects set forth herein.

One or more implementations include a computer-readable medium including processor-executable instructions configured to implement one or more embodiments presented herein. As discussed herein the various aspects enable intraday alert volume adjustments based on risk parameters. An embodiment of a computer-readable medium or a computer-readable device devised in these ways is illustrated in FIG. 9, wherein an implementation 900 includes a computer-readable medium 902, such as a CD-R, DVD-R, flash drive, a platter of a hard disk drive, and so forth, on which is encoded computer-readable data 904. The computer-readable data 904, such as binary data including a plurality of zero's and one's as illustrated, in turn includes a set of computer instructions 906 configured to operate according to one or more of the principles set forth herein.

In the illustrated embodiment 900, the set of computer instructions 906 (e.g., processor-executable computer instructions) may be configured to perform a method 908, such as the method 600 of FIG. 6 and/or the method 800 of FIG. 8, for example. In another embodiment, the set of computer instructions 906 may be configured to implement a system, such as the system 200 of FIG. 2 and/or the system 300 of FIG. 3, for example. Many such computer-readable media may be devised by those of ordinary skill in the art that are configured to operate in accordance with the techniques presented herein.

As used in this application, the terms "component", "module," "system", "interface," "manager," and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter may be implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

FIG. 9 and the following discussion provide a description of a suitable computing environment to implement embodiments of one or more of the aspects set forth herein. The operating environment of FIG. 9 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, embodiments are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

Figure 10:
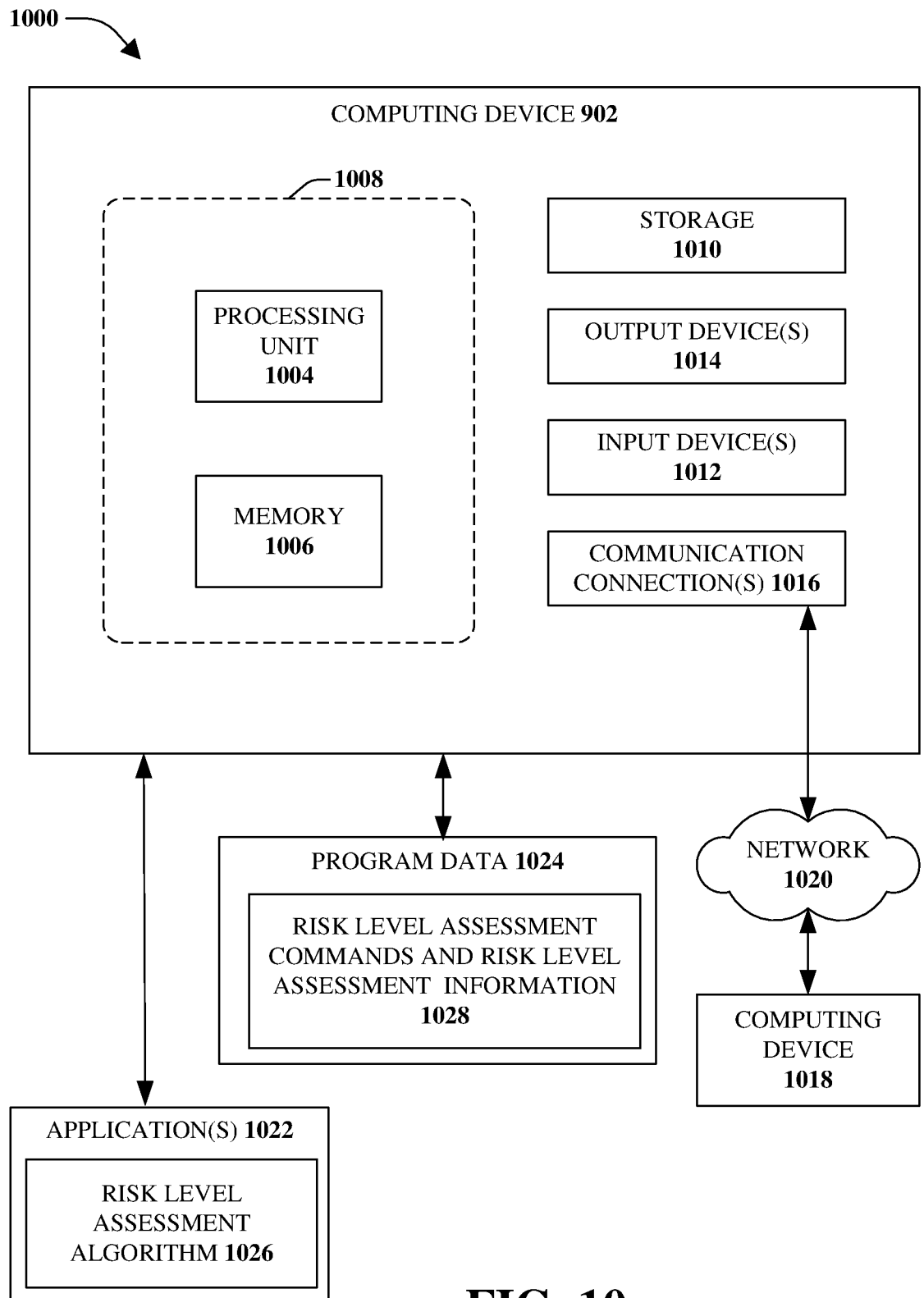
FIG. 10 illustrates an example, non-limiting computing environment where one or more of the aspects set forth herein are implemented, according to one or more aspects.

FIG. 10 illustrates a system 1000 that may include a computing device 1002 configured to implement one or more embodiments provided herein. In one configuration, the computing device 1002 may include at least one processing unit 1004 and at least one memory 1006. Depending on the exact configuration and type of computing device, the at least one memory 1006 may be volatile, such as RAM, non-volatile, such as ROM, flash memory, etc., or a combination thereof. This configuration is illustrated in FIG. 10 by dashed line 1008.

In other embodiments, the computing device 1002 may include additional features or functionality. For example, the computing device 1002 may include additional storage such as removable storage or non-removable storage, including, but not limited to, magnetic storage, optical storage, etc. Such additional storage is illustrated in FIG. 10 by storage 1010. In one or more embodiments, computer readable instructions to implement one or more embodiments provided herein are in the storage 1010. The storage 1010 may store other computer readable instructions to implement an operating system, an application program, etc. Computer readable instructions may be loaded in the at least one memory 1006 for execution by the at least one processing unit 1004, for example.

Computing devices may include a variety of media, which may include computer-readable storage media or communications media, which two terms are used herein differently from one another as indicated below.

Computer-readable storage media may be any available storage media, which may be accessed by the computer and includes both volatile and nonvolatile media, removable and non-removable media. By way of example, and not limitation, computer-readable storage media may be implemented in connection with any method or technology for storage of information such as computer-readable instructions, program modules, structured data, or unstructured data. Computer-readable storage media may include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which may be used to store desired information. Computer-readable storage media may be accessed by one or more local or remote computing devices (e.g., via access requests, queries or other data retrieval protocols) for a variety of operations with respect to the information stored by the medium.

Communications media typically embody computer-readable instructions, data structures, program modules, or other structured or unstructured data in a data signal such as a modulated data signal (e.g., a carrier wave or other transport mechanism) and includes any information delivery or transport media. The term "modulated data signal" (or signals) refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The computing device 1002 may include input device(s) 1012 such as keyboard, mouse, pen, voice input device, touch input device, infrared cameras, video input devices, or any other input device. Output device(s) 1014 such as one or more displays, speakers, printers, or any other output device may be included with the computing device 1002. The input device(s) 1012 and the output device(s) 1014 may be connected to the computing device 1002 via a wired connection, wireless connection, or any combination thereof. In one or more embodiments, an input device or an output device from another computing device may be used as the input device(s) 1012 and/or the output device(s) 1014 for the computing device 1002. Further, the computing device 1002 may include communication connection(s) 1016 to facilitate communications with one or more other devices, illustrated as a computing device 1018 coupled over a network 1020.

One or more applications 1022 and/or program data 1024 may be accessible by the computing device 1002. According to some implementations, the application(s) 1022 and/or program data 1024 are included, at least in part, in the computing device 1002. The application(s) 1022 may include a risk level assessment algorithm 1026 that is arranged to perform the functions as described herein including those described with respect to the system 400 of FIG. 4. The program data 1024 may include risk level assessment commands and risk level assessment information 1028 that may be useful for operation with holistic tracking and monitoring of goals as described herein.

Although the subject matter has been described in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or." Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first," "second," or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising," "comprises," "including," "includes," or the like generally means comprising or including.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What is claimed is:

1. A system for intraday monitoring of potentially fraudulent or illegal transactions, wherein the transactions comprise interactions between a financial institution and a plurality of users of the services of the financial institution, comprising:
one or more processor that executes the following computer executable components stored in one or more memory devices:
an analysis manager that classifies an identity of each individual user among the plurality of users into a risk tier of a set of risk tiers based on attributes associated with the identity of each respective individual user, wherein the risk tier of a particular user does not change over a plurality of interactions associated with that user;
a status manager that receives a plurality of interactions continuously during each day, wherein each of the plurality of interactions is associated with the identity of an individual user of the plurality of users, the status manager being configured to generate an alert with respect to interactions determined to represent a fraud risk and to assign a priority level to each alert, wherein the priority level of each alert is based at least in part on the risk tier of the individual user associated with the interaction for which the alert was generated, wherein the priority level of each alert comprises one of a low priority, a medium priority, and a high priority;
an interface component that outputs a workflow tool that provides a ranking window in the interface for displaying the alerts generated by the status manager to indicate the priority level of each of the plurality of alerts, wherein the interface component dynamically ranks newly generated alerts with previously generated alerts associated with the received interactions;
a resource manager that compares a volume of interactions and a volume of alerts associated with a current time of day to an available staffing level of human alert reviewers to determine if the volume of alerts exceeds a predetermined threshold capacity of the available staffing level; and
an implementation manager in electronic communication with the interface component and the resource manager, the implementation manager being configured to automatically selectively apply a classification system to the alerts, wherein if the resource manager determines that the volume of alerts exceeds the predetermined threshold capacity, the implementation manager causes the system to automatically apply the classification system that ranks the plurality of alerts according to the priority level assigned to each alert by the status manager and causes the interface component to display:
a first set of alerts ranked as the low priority to populate the ranking window at a bottom of an event notification,
a second set of alerts ranked as the high priority to populate the ranking window at a top of the event notification, and
a third set of alerts ranked as the medium priority to populate the ranking window above the first set of alerts and below the second set of alerts,
wherein the implementation manager dynamically updates the ranking window upon the receipt of additional alerts while the classification system is applied, the dynamic updating comprising automatically applying an exclusion criterion to low priority alerts whereby the alerts are not visible in the ranking window to the human reviewers, wherein the exclusion criterion comprises one of:
automatically approving the interactions associated with the alerts, or
automatically changing the priority level of the alerts associated with the lowest risk tier of the individual users associated with such alerts from the medium or high priority to the low priority, whereby the alerts are displayed at the bottom of the ranking window wherein, if the resource manager determines that the volume of alerts does not exceed the predetermined threshold capacity, the implementation manager causes the system to automatically cease applying the classification system, wherein a priority level is not assigned to the alerts and all alerts are displayed in the ranking window without ranking.

2. The system of claim 1, further comprising a historical reference module that evaluates historical information related to the identity of each individual user.

3. The system of claim 1, wherein risk tiers in the set of risk tiers are defined as risk levels, the analysis manager assigns a high-risk level to a new user without historical information being available.

4. The system of claim 1, further comprising a tracking manager that determines a location of an initiation of an interaction associated with an individual user among the plurality of users, the status manager compares the location to an expected location and increases the priority level based on a determination that the location does not match the expected location.

5. The system of claim 1, further comprising a tracking manager that determines a machine access code of a device from which an interaction associated with an individual user among the plurality of users was originated, the status manager compares the machine access code to an expected machine access code and increases the priority level based on a determination that the machine access code does not match the expected machine access code.

6. The system of claim 1, wherein an attribute of the attributes relates to a security procedure of the identity of the user.

7. The system of claim 1, wherein
the implementation manager causes alerts ranked as the low priority to automatically be approved based on a determination that the volume of alerts exceeds the predetermined threshold capacity of the available staffing level, wherein the low priority does not show up on the ranking window.

8. The system of claim 1, wherein a high priority level is assigned based on a determination that historical information is not available.

9. The system of claim 1, further comprising an observation manager that evaluates a real-world outcome and feeds back the real-world outcome to the analysis manager.

10. A method for intraday monitoring of potentially fraudulent or illegal transactions, wherein the transactions comprise interactions between a financial institution and a plurality of users of the services of the financial institution, comprising:
assigning, by a system comprising at least one processor, an identity of each individual user among the plurality of users to a risk level, wherein the risk level is determined based on historical information associated with the identity of each respective individual user among the plurality of users;
receiving, by the system, a plurality of events continuously during each day, wherein each event is associated with the identity of an individual user of the plurality of users;
generating an alert with respect to events determined to represent a fraud risk;
prioritizing, by the system, each alert based at least in part on the risk level of the individual user associated with the event for which the alert was generated, wherein prioritizing comprises assigning each alert a priority level selected from a low priority, a medium priority, and a high priority;
outputting, by the system, a ranking window in an interface for displaying the generated alerts that indicates a descending order of risk level for each of the plurality of alerts, wherein the outputting comprises dynamically ranking newly received alerts with previously generated alerts associated with the received plurality of events;
determining, by the system, that a volume of alerts received exceeds a predetermined threshold capacity of an available staffing level of human alert reviewers; and
selectively applying a classification system to the alerts, upon the determination that the volume of alerts exceeds the predetermined threshold capacity, wherein the classification system ranks the plurality of alerts according to the priority level assigned to each alert;
displaying, by the system:
a first set of alerts ranked as the low priority to populate the ranking window at a bottom of an event notification,
a second set of alerts ranked as the high priority to populate the ranking window at a top of the event notification, and
a third set of alerts ranked as the medium priority to populate the ranking window above the first set of alerts and below the second set of alerts,
dynamically updating an exclusion criterion to low priority alerts whereby the alerts are not visible in the ranking window to the human reviewers, wherein the exclusion criterion comprises one of:
automatically approving the interactions associated with the alerts, or
automatically changing the priority level of the alerts associated with the lowest risk tier of the individual users associated with such alerts from the medium or high priority to the low priority, whereby the alerts are displayed at the bottom of the ranking window; and
ceasing applying the classification system if it is determined that the volume of alerts does not exceed the predetermined threshold capacity, wherein a priority level is not assigned to the alerts and all alerts are displayed in the ranking window without ranking.

11. The method of claim 10, further comprising:
prior to the outputting, determining, by the system, an origin location of each of the plurality of events;
comparing, by the system, the origin location with an expected location determined based on the historical information; and
selectively changing, by the system, a prioritization of each event of the plurality of events for which a determination is made that the origin location does not match an expected location.

12. The method of claim 10, further comprising:
prior to the outputting, determining, by the system, a machine access identity associated with each of the plurality of events;
comparing, by the system, the machine access identity to an expected machine access identity based on the historical information; and
selectively changing, by the system, a prioritization of each event of the plurality of events for which a determination is made that the machine access identity does not match the expected machine access identity.

13. The method of claim 10, further comprising removing, by the system, at least one of the plurality of alerts from the ranking based on respective expirations or based on respective escalation determinations.

14. The method of claim 10, wherein the historical information comprises attributes that independently carry a measure of a vulnerability of the identity of each of the plurality of users.

15. The method of claim 10, further comprising:
analyzing, by the system, an outcome based on investigative activities; and
validating, by the system, a model used for the assigning.

16. A computer-readable storage device that stores executable instructions that, in response to execution, cause a system for intraday monitoring of potentially fraudulent or illegal transactions, wherein the transactions comprise interactions between a financial institution and a plurality of users of the services of the financial institution, comprising at least one processor to perform operations, comprising:
classifying an identity of each individual user among the plurality of users into a risk level of a set of risk levels based on attributes associated with the identity of each individual user;
receiving a plurality of transactions continuously during each day, wherein each of the plurality of transactions is associated with the identity of an individual user among the plurality of users;
generating an alert with respect to transactions determined to represent a fraud risk;
assigning a priority level to each alert wherein the priority level is based at least in part on the risk level of the individual user associated with the transaction for which the alert was generated, wherein the priority level comprises a low priority, a medium priority, and a high priority;
outputting a workflow tool that provides a ranking window in an interface for displaying an indication of each alert and the priority level based on temporal data defined with respect to each transaction of the plurality of transactions, wherein the outputting comprises dynamically ranking newly generated alerts with previously generated alerts associated with the received transactions;
comparing a number of volume of transactions and a volume of alerts associated with a current time of day to an available staffing level of human alert reviewers to determine if the volume of transactions and alerts exceeds a predetermined threshold capacity of the available staffing level;
selectively applying a classification system to the alerts upon the determination that the volume of alerts exceeds the predetermined threshold capacity, wherein the classification system ranks the plurality of alerts according to the priority level assigned to each alert;
displaying, by the system:
a first set of alerts ranked as a low priority to populate a ranking window at a bottom of an event notification,
a second set of alerts ranked as a high priority to populate the ranking window at a top of the event notification, and
a third set of alerts ranked as a medium priority to populate the ranking window above the first set of transactions and below the second set of transactions,
dynamically updating the ranking window an exclusion criterion to low priority alerts whereby the alerts are not visible in the ranking window to the human reviewers, wherein the exclusion criterion comprises one of:
automatically approving the interactions associated with the alerts, or
automatically changing the priority level of the alerts associated with the lowest risk tier of the individual users associated with such alerts from the medium or high priority to the low priority, whereby the alerts are displayed at the bottom of the ranking window,
ceasing applying the classification system if it is determined that the volume of alerts does not exceed the predetermined threshold capacity, wherein a priority level is not assigned to the alerts and all alerts are displayed in the ranking window without ranking.

17. The computer-readable storage device of claim 16, wherein the indication of each of alert is output such that a relative ranking of the alert is perceivable in comparison to respective priority levels assigned to other transactions associated with the identity of the user or with other identities of other users, and wherein respective temporal data associated with the other transactions overlaps in part with the temporal data defined with respect to the transaction.

* * * * *